United States Patent [19]

Schoenhard

[11] Patent Number: 4,775,697
[45] Date of Patent: Oct. 4, 1988

[54] ABRASIVE PROCESS FOR POLYMER RECOVERY

[76] Inventor: James D. Schoenhard, 665 N. 12th Ave., Canton, Ill. 61520

[21] Appl. No.: 23,835

[22] Filed: Mar. 9, 1987

[51] Int. Cl.$^4$ .................. B07B 7/00; B29B 17/00; C08J 11/06
[52] U.S. Cl. .................. 521/48; 521/40; 521/45.5; 528/502
[58] Field of Search .................. 521/40, 48, 45.5; 528/502; 51/313, 315, 316

[56] References Cited

U.S. PATENT DOCUMENTS

| | | | |
|---|---|---|---|
| 3,335,966 | 8/1967 | Haveman | 521/48 |
| 3,928,253 | 2/1975 | Thornton et al. | 521/46 |
| 3,969,601 | 10/1973 | Knox | 521/48 |
| 4,020,020 | 4/1977 | Appleyard et al. | 521/40 |
| 4,602,046 | 7/1986 | Buser et al. | 521/40 |

FOREIGN PATENT DOCUMENTS 0149372 7/1981 German Democratic Rep. ... 521/48

Primary Examiner—Allan M. Lieberman
Attorney, Agent, or Firm—Cook, Wetzel & Egan, Ltd.

[57] ABSTRACT

Pure polymer, such as polyester used in photographic film and in plastic walls of drink bottles or polycarbonate used in high-quality plastic beverage bottles, is separated from thin saran and like coating layers of a multi-layer film or sheet in a dry process. The coating layer is typically ½% or less of the total sheet or film thickness. The dry abrasion process in one form comprises rotating and mixing a volume of dry plastic chips of said film or sheet with about two volumes of small, hard abrasive particles such as quartzite aggregate, glass cullet, or the like, for a time just sufficient to abrade the thin coating layer from the film or sheet. The abrasive particles and the coating dust are separated from the pure polymer by air classifiers. The resulting polymer chips are clean and dry and are immediately available for pelletizing and reuse. Polymer may also be recovered from the dust, as by electrostatic separation.

6 Claims, 1 Drawing Sheet

U.S. Patent    Oct. 4, 1988    4,775,697
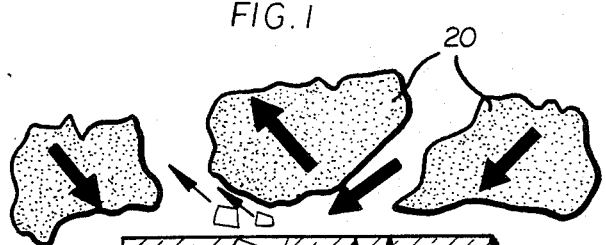
FIG. 1
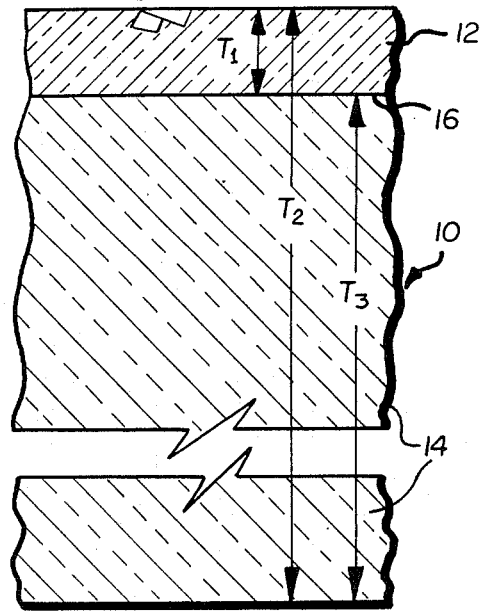
FIG. 2
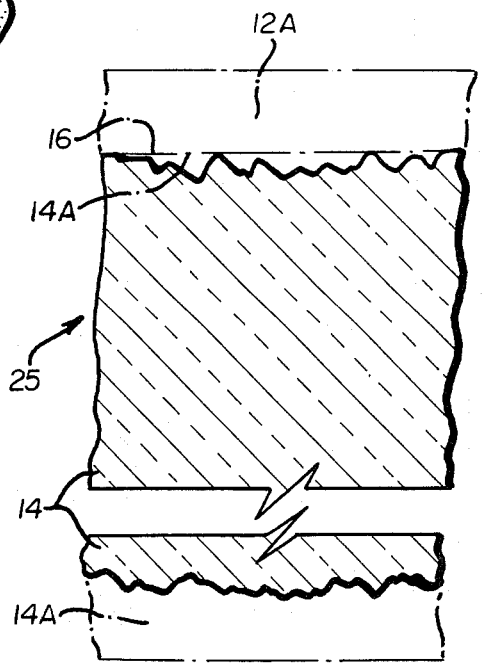
FIG. 3
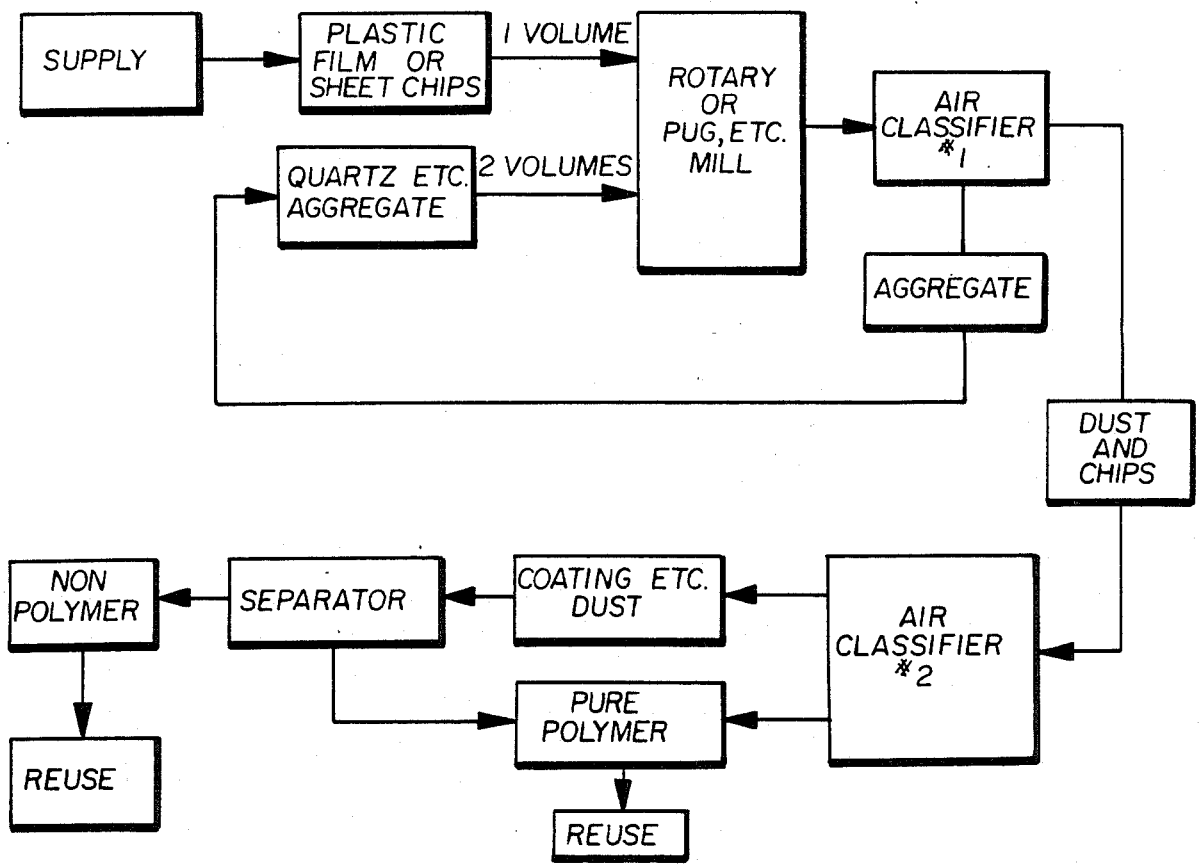

ABRASIVE PROCESS FOR POLYMER RECOVERY

The present invention relates to apparatus and methods for separating and recovering valuable raw materials. It particularly relates to dry processes for recovering polymer such as polyester and polycarbonate plastics from multi-layer sheets and films where such polymer has a thin coating of saran and/or other substance thereon to improve the gas permeation resistance, toughness, or other characteristics or to provide an emulsion coating as in photographic film.

My prior invention, entitled "Polymer Layer Recovery from a Multi-Layered Chip Material", U.S. Pat. No. 4,629,780, discloses and claims wet chemical processes for separating saran and photographic emulsion layers from polyester and polyvinylchloride layers in photographic and beverage container sheets and films. The wet process has some advantages, including recovery of silver as disclosed in my application entitled "Filter Process for Silver Recovery from Polymeric Films," application Ser. No. 889,637, filed July 28, 1986, now pending. However, recycling of bottle films and sheets and particularly recycling of newer, high-quality polycarbonate bottles benefits in reduction of recycling time from use of a dry process. Polycarbonate bottles particularly require recycling to make such use of the expensive plastic economically feasible.

No dry process for recycling raw materials from plastic films is known, except for my co-pending invention in "A Dry Process for Polymer Recovery", U.S. Application Ser. No. 020,470 filed Mar. 2, 1987. In unrelated arts, ball or rolling mills are used to abrade and polish decorative stones. Rotating mills are used for mixing components such as in fertilizer, and for coating aggregate with asphalt for paving operations. Such ball or rolling mill and other rotating processes have not, to my knowledge, ever been used by others to abrade plastic for recycling. Chopping of photographic film and bottles into chip-size materials to afford easier handling and to enable separation of metal caps, paper label-bearing portions, and polyethylene bottoms is known, but no abrading of chips of a multi-layered film to remove coating layers to recover pure polymer in accordance with the present invention is known.

In summary, the present invention comprises an abrasive method of separating and isolating a substantially pure polyemer such as as polyester or polycarbonate from a multi-layer film or sheet having a body of pure polymer in one layer and having one or more other substances such as saran or cellulose triacetate in one or more other, thin, coating layers. Photographic film and plastic drink and beverage containers are primary examples of such films and sheets. The method comprises a first step of placing one volume of chips of the film or sheet in a rotating mill, pug mill, or the like together with about two volumes of small, hard, abrasive particles such as quartz, quartzite rock, glass cullet, or igneous rock of about one-eighth to one-half inch size. The mill is then rotated, to collide and abrade the surfaces of the chips with the abrasive particles, for a selected time in a batch process or for a selected dwell time in a continuous process. The time is generally less than five minutes, but is experimentally determined, and varies with the nature of the coating of the polymer, with the particular particles used, and with other factors such as the size of the mill, the fill ratio, and the dryness of the materials used. Successful treatment and purity of the resulting polymer is readily determined by a melting test. The particles, the pure sheet or film remnants, and the coating dust are separated from one another by air classifiers, and the materials are then conveyed to collection and reuse locations. Polymer dust may also be recovered by a further separation step.

In the drawings, FIG. 1 is a greatly enlarged cross-sectional view, partly in schematic form, of a multi-layer sheet or film being recycled in the process of the present invention;

FIG. 2 is a greatly enlarged cross-sectional view, of the pure polymer remnant or portion of a multi-layer sheet or film after recycling according to the process of the present invention; and FIG. 3 is a block diagram of the process steps of the present invention in one form.

A portion of a multi-layer plastic film or sheet is shown in greatly enlarged cross section at 10 in FIG. 1. The sheet or film 10 comprises a thin coating layer 12 and a thicker body layer 14 in the form shown; other plastic sheets having additional coating layers besides 12 may also be separated in accordance with the present invention, as hereafter described. The layer 12 is typically sputter-coated or laminated to the thicker layer 14 in order to give the plastic film or sheet 10 desired handling characteristics, impermeability of pressurized gases, or the like.

In photographic film, the layer 12 has a thickness T1 which is about a half percent of the total thickness T2 of the film 10. In beverage container films, the dimension T1 may be an even smaller percentage of the overall thickness T2 or of the thickness T3 of the polymer layer alone.

A junction 16 between the layers 12 and 14 is shown as a clear demarcation, but in actuality the junction may be somewhat blurred by the surface characteristics of the two substances and their method of joining or lamination. The princples of the invention will generally apply despite fuzziness or irregularities in the junction 16.

Whereas in my prior, patented processes the layers 12 and 14 are separated at the boundary 16 by chemical action, my present invention provides a dry method of separating substantially all the pure material of layer 14 from the material of layer 12. As is shown in FIGS. 1 and 2, particles are abraded from the film 10 by collision contacts with particles of aggregate 20 which tumble and collide with the film or sheet chips or pieces 10.

Any hard, abrasive, non-fracturing, and tough aggregate can be used for the particles 20, preferably in a mix of pieces of approximately ⅛th inch to ½ inch maximum dimension. Densely grated aggregate such as quartzite, such as that used in fish tanks, igneous rock, glass cullet, and the like can be used. Silica materials typically have a hardness of about 7, while saran and cellulose triacetate have hardnesses of about 2. The thin coating of saran and like materials therefore will quickly abrade from the polyester or polycarbonate film substrate, after the two to five minutes, resulting in a remnant 25 like that of FIG. 2, plus the aggregate and the dust of coating and polymer. However, the polymer remnant of layer 14 will be pure polymer between the araded surfaces at the top and bottom of FIG. 2. The coating 12A and upper and lower portions 14A of the polymer layer 14 will have been abraded away as fine dust.

Any appropriate rotary mill, pug mill, or the like, either a batch process or a continuous process, can be used to tumble and abrade the chips 10 and the aggregate 20 together. A rotary cylinder with internal lifters which is five feet long and about two feet high rotated on its long axis and tilted slightly downwardly to provide a dwell time of about five minutes within the chamber would work adequately. A rotary drum-like mill such as a mobile cement truck could, in a batch process, abrade the coating from ten tons of plastic chips per hour, with a five minute abrasion time for each load. A pug mill such as used for coating aggregate with asphalt could be employed, with some reduction of dwell time.

The chips and aggregate are mixed in a ratio of about one volume of chips to about two volumes of aggregate. In each case, the success of the process in removing the coating layer from the polymer is easily measured by a melting test. A small sample of chip remnants is removed from the rotary mill and melted in a pan over a gas flame. Any saran material remaining on a chip remnant will leave a deep brown speck, readily visible to an observer. If specks appear, more tumbling and abrasion time, a higher ratio of aggregate to chips, or a lower fill in the mill to increase the tumbling action may be accomplished. Because of the several variables, more skill is required in the operators to successfully practice this invention than is required in operation of, for instance, the invention of my co-pending application, involving fine grinding of the entirety of or a shaved surface layer of the chips. However, the equipment needed to practice the present invention is much less expensive then that required for the grinding process. Further, if loss of more of the polymer layer 14 is acceptable, as is in the case of polyester, or if an electrostatic dust separation step such as is disclosed in my co-pending application as is used for polycarbonate, excess abrasion can be used as a safety factor to insure that all of the coating layer indeed is removed.

The abraded sheet or film remnants, aggregate, and coating dust emerging from the rotary mill are separated by any known separation system, such as an air classifier. At a first air classification station, the heavy aggregate particles are washed in streams of air and dust is removed from their surfaces. At the same time the dust and sheet or film remnants are floated through the classifier and into a second classification station. The aggregate is returned to the in-feed station or hopper for reuse. The dust and abraded chips are sent to a second separator, such as a second air classifier. Appropriate screens can be used to ensure that small chips are not lost into the dust. There the chips are washed in streams of air to remove dust particles from their surfaces, and the dust is floated from and separated from the remnant sheet or film. The dust and the polymer remnants are separately removed from the classifier.

The dry polymer chips are immediately available for use, and conveniently are pelletized for handling and storage. Where the abrasion process has been used on a valuable material such as polycarbonate, or where much polymer has been removed as a safety factor, an electrostatic separator such as is described in my co-pending application can be employed to separate the pure polymer from the coating layer dust. The coating layer dust also can be reused.

The full process of the invention is depicted schematically in FIG. 3. From a supply, plastic film or sheet or chips thereof are fed into a rotary mill, pug mill, or the like together with two volumes of hard, non-fracturing aggregate such as quartzite or glass cullet. The film or sheet or chips and the aggregate are processed through the mill until the plastic surfaces are abraded beyond the coating layer. This condition is established by testing of samples, but should take 2 to 5 minutes per batch.

Next, the aggregate is removed from the sheet or film remnants and the dust by an appropriate separator, and is returned to the aggregate in-feed. The dust and film or sheet remnants are further separated from one another, as in a further air classifier. The polymer is available for reuse immediately in chip form or formed into pellets. The coating dust can be used as is, or can be separated further to recover valuable or excess polymer dust.

In one example, I took 1 quart of photographic film chips ("blue" chips) from x-ray film, and 2 quarts of graded quartzite aggregate obtained from a fish tank supply store. I combined them in a rotary drum about 12 inches across and 18 inches long. I rotated the cylinder by pulses from an electric drill at an average of about 10 RPM, observing the tumbling of the chips and aggregate. After 5 minutes, I removed test chips and, by melting them in a sample pan, found no trace of saran.

As is evident from the foregoing specification, the invention is adaptable to many different processes and is very boad in its conception and implementation. Other forms of surface abrasion, such as sandblasting or gritblasting processes, could be used to remove the surface coating from a plastic sheet or film, for instance. My invention is limited solely by the claims appended hereto, and equivalents thereof.

I claim as my invention:

1. A dry method of separating and isolating a substantially pure polymer selected from the group consisting of polyester, polycarbonate a polymer which is similar in abrasion susceptibility to said polyestevand polycarbonate from a multi-layer thereof and having a vinyl chloridevinylidene chloride copolymer or one or more other substances similarly susceptible to abrasion in one or more coating layers on one or more surfaces of said layer of polymer, the method comprising the of:
   dividing the sheet or film into chips;
   measuring about one volume of said chips and about two volumes of hard, abrasive particles selected from the group consisting of quartz, quartzite rock, glass cullet, igneous rock and any mixture thereof and of a maximum size range from about $\frac{1}{8}$ to about $\frac{1}{2}$ inch;
   mixing the chips and particles together continuously to cause them to collide and to rub the surfaces of the chips and the particles together for a time at least sufficient to abrade substantially all the coating layers from said chips and into dust; and
   separating the remnants of the chips from the particles and from the dust and collecting the dust and chips separately.

2. The method defined in claim 1, wherein the mixing occurs by rolling or tumbling the chips and particles together in a rolling mill.

3. The method defined in claim 1, wherein the dust is separated from the chips by streams of air.

4. The method defined in claim 1, further comprising a step of testing selected chip remnants during the mixing step by melting same and inspecting the melt visually to determine the presence of coating thereon, and selectively continuing the mixing and abrasion of the chips or terminating the abrasion, in accordance with the results of the test.

5. The method defined in claim 1, wherein the measuring and mixing steps are carried out in a batch process.

6. The method defined in claim 1, wherein the measuring and mixing steps are carried out continuously and the chips and particles pass together through a container in a time not less than that sufficient to abrade substantially all the coating layers from all said chips.

* * * * *